US012801377B2

(12) United States Patent
Young et al.

(10) Patent No.: US 12,801,377 B2
(45) Date of Patent: Nov. 17, 2026

(54) SYSTEM AND METHOD FOR CENTRALIZED APPLICATION DEVELOPMENT AND PIPELINE MANAGEMENT VIA EVENT DATA STREAMING

(71) Applicant: BANK OF AMERICA CORPORATION, Charlotte, NC (US)

(72) Inventors: Lauderdale Sonnenberg Young, Big Run, PA (US); Peter Tavormina, Hainesport, NJ (US); Suresh Velagaleti, Belle Mead, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 288 days.

(21) Appl. No.: 18/515,606

(22) Filed: Nov. 21, 2023

(65) Prior Publication Data

US 2025/0165249 A1 May 22, 2025

(51) Int. Cl.
*G06F 8/71* (2018.01)

(52) U.S. Cl.
CPC .................................... *G06F 8/71* (2013.01)

(58) Field of Classification Search
CPC ........................................................ G06F 8/71
See application file for complete search history.

(56) References Cited

U.S. PATENT DOCUMENTS 7,487,302 B2 * 2/2009 Gouldey ............. G06F 11/1407 712/15
7,827,448 B1 * 11/2010 Breslin ................. H04L 43/045 709/224
8,677,315 B1 * 3/2014 Anderson ................. G06F 8/60 717/124
9,910,654 B1 * 3/2018 Brigham, II ........ G06F 11/3692
9,934,016 B1 * 4/2018 Acosta .................... G06F 11/36
10,157,044 B2 * 12/2018 Khazanchi ................ G06F 8/71
10,223,658 B2 * 3/2019 Cornilescu ................ G06F 8/71
10,613,970 B1 4/2020 Jammula et al.
10,685,115 B1 6/2020 Lieberman et al.
11,061,669 B2 7/2021 Mittell et al.
11,126,541 B2 9/2021 Parees et al.
11,151,020 B1 10/2021 Bajoria
11,238,048 B1 * 2/2022 Breeden ................ G06F 16/906
(Continued)

*Primary Examiner* — Douglas M Slachta
(74) *Attorney, Agent, or Firm* — Moore & Van Allen PLLC; Nicholas C. Russell

(57) ABSTRACT

Systems, computer program products, and methods are described herein for centralized application development and pipeline management via event data streaming. The present disclosure embraces event data received from discrete components of an application development pipeline platform. The event data is received directly, via webhooks, or via change data capture. The event data is analyzed to determine conformity to a standardized data structure. If the discrete components already transmit and receive event data in the standardized data structure, the application development pipeline platform communicates with such discrete components directly. If the discrete components don't transmit and receive event data in the standardized data, a middleware layer receives the event data from the discrete components and transforms the event data from the discrete components to the standardized data structure.

17 Claims, 5 Drawing Sheets

(56) References Cited

U.S. PATENT DOCUMENTS

| | | | | |
|---|---|---|---|---|
| 11,265,202 | B2 * | 3/2022 | Khazanchi | H04L 41/5096 |
| 11,301,246 | B2 | 4/2022 | Bregman et al. | |
| 11,481,197 | B1 | 10/2022 | Comer | |
| 11,500,985 | B1 | 11/2022 | Balber et al. | |
| 11,675,816 | B1 * | 6/2023 | Chandrasekharan | G06F 11/3082 707/737 |
| 11,693,651 | B1 | 7/2023 | Balber et al. | |
| 11,853,735 | B1 | 12/2023 | Choudhury et al. | |
| 11,983,512 | B2 | 5/2024 | Mohanty et al. | |
| 12,242,892 | B1 * | 3/2025 | Burnett | G06F 9/45533 |
| 2017/0364844 | A1 * | 12/2017 | Saraf | G06F 9/485 |
| 2018/0321918 | A1 * | 11/2018 | Mcclory | G06F 11/3684 |
| 2019/0227793 | A1 * | 7/2019 | Ramasamy | G06Q 10/06398 |
| 2021/0011698 | A1 * | 1/2021 | Bond | G06F 11/3466 |
| 2021/0294716 | A1 * | 9/2021 | Mosquera | G06F 11/302 |
| 2021/0294730 | A1 | 9/2021 | Parees et al. | |
| 2022/0303295 | A1 | 9/2022 | Erlingsson et al. | |
| 2022/0311794 | A1 * | 9/2022 | Maya | G06F 11/0766 |
| 2023/0058197 | A1 | 2/2023 | Comer | |
| 2023/0103049 | A1 * | 3/2023 | Chitalia | G06F 21/577 726/25 |
| 2024/0192974 | A1 * | 6/2024 | Gadupudi | G06F 9/544 |
| 2024/0303218 | A1 * | 9/2024 | Zhao | G06F 15/7867 |

* cited by examiner

SYSTEM AND METHOD FOR CENTRALIZED APPLICATION DEVELOPMENT AND PIPELINE MANAGEMENT VIA EVENT DATA STREAMING

FIELD OF THE INVENTION

The present invention embraces a system for centralized application development and pipeline management via event data streaming.

BACKGROUND

In the contemporary technological landscape, software development and continuous integration and continuous deployment ("CI/CD") rely heavily on lifecycle management applications, often incorporating numerous specialized plug-ins. However, a challenge lies in the lack of communication and central reporting among these plug-ins, making it hard to gain a comprehensive view of the software development lifecycle and complicating the integration of new plug-ins. Bridging these gaps is crucial for improving the efficiency and integration of this complex technological environment. Thus, there is a need for centralized application development and pipeline management via event data streaming.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for centralized application development and pipeline management via event data streaming is presented. The system may include a processing device, and a non-transitory storage device including instructions that, when executed by the processing device, causes the processing device to perform the steps of receiving event data from at least one discrete component of an application development pipeline platform, each discrete component operating independently and subject to its own development cycle, analyzing the event data to determine conformity to a standardized data structure, automatically generating an update signal whenever the event data from the at least one discrete component is received, and transmitting, based on the update signal, a display signal to display a pipeline progress on a graphical dashboard of a user interface, wherein the pipeline progress may include the event data.

In some embodiments, the at least one discrete component transmits and receives event data in the standardized data structure.

In some embodiments, executing the instructions further causes the processing device to perform the steps of receiving, at an adaptive middleware layer, the event data from the at least one discrete component, wherein the at least one discrete component transmits and receives event data in a non-standardized data structure, and converting, via the adaptive middleware layer, the event data from the at least one discrete component to the standardized data structure.

In some embodiments, receiving the event data from the at least one discrete component may include receiving the event data via receiving the event data directly.

In some embodiments, receiving the event data from the at least one discrete component may include receiving the event data via webhooks.

In some embodiments, receiving the event data from the at least one discrete component may include receiving the event data via change data capture.

In some embodiments, the event data is an output of at least one selected from a group consisting of version control, security, scanning, load testing, code review, and functional testing.

In another aspect, a computer program product for centralized application development and pipeline management via event data streaming is presented. The computer program product may include a non-transitory computer-readable medium including code causing an apparatus to receive event data from at least one discrete component of an application development pipeline platform, each discrete component operating independently and subject to its own development cycle, analyze the event data to determine conformity to a standardized data structure, automatically generate an update signal whenever the event data from the at least one discrete component is received, and transmit, based on the update signal, a display signal to display a pipeline progress on a graphical dashboard of a user interface, wherein the pipeline progress may include the event data.

In some embodiments, the at least one discrete component transmits and receives event data in the standardized data structure.

In some embodiments, the code further causes the apparatus to: receive, at an adaptive middleware layer, the event data from the at least one discrete component, wherein the at least one discrete component transmits and receives event data in a non-standardized data structure, and convert, via the adaptive middleware layer, the event data from the at least one discrete component to the standardized data structure.

In some embodiments, receiving the event data from the at least one discrete component may include receiving the event data via receiving the event data directly.

In some embodiments, receiving the event data from the at least one discrete component may include receiving the event data via webhooks.

In some embodiments, receiving the event data from the at least one discrete component may include receiving the event data via change data capture.

In some embodiments, the event data is an output of at least one selected from a group consisting of version control, security, scanning, load testing, code review, and functional testing.

In yet another aspect, a method for centralized application development and pipeline management via event data streaming is presented. The method may include receiving event data from at least one discrete component of an application development pipeline platform, each discrete component operating independently and subject to its own development cycle, analyzing the event data to determine conformity to a standardized data structure, automatically generating an update signal whenever the event data from the at least one discrete component is received, and transmitting, based on the update signal, a display signal to display a pipeline progress on a graphical dashboard of a user interface, wherein the pipeline progress may include the event data.

In some embodiments, the at least one discrete component transmits and receives event data in the standardized data structure.

In some embodiments, the method may further include receiving, at an adaptive middleware layer, the event data from the at least one discrete component, wherein the at least one discrete component transmits and receives event data in a non-standardized data structure, and converting, via the adaptive middleware layer, the event data from the at least one discrete component to the standardized data structure.

In some embodiments, receiving the event data from the at least one discrete component may include receiving the event data via webhooks.

In some embodiments, receiving the event data from the at least one discrete component may include receiving the event data via change data capture.

In some embodiments, the event data is an output of at least one selected from a group consisting of version control, security, scanning, load testing, code review, and functional testing.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
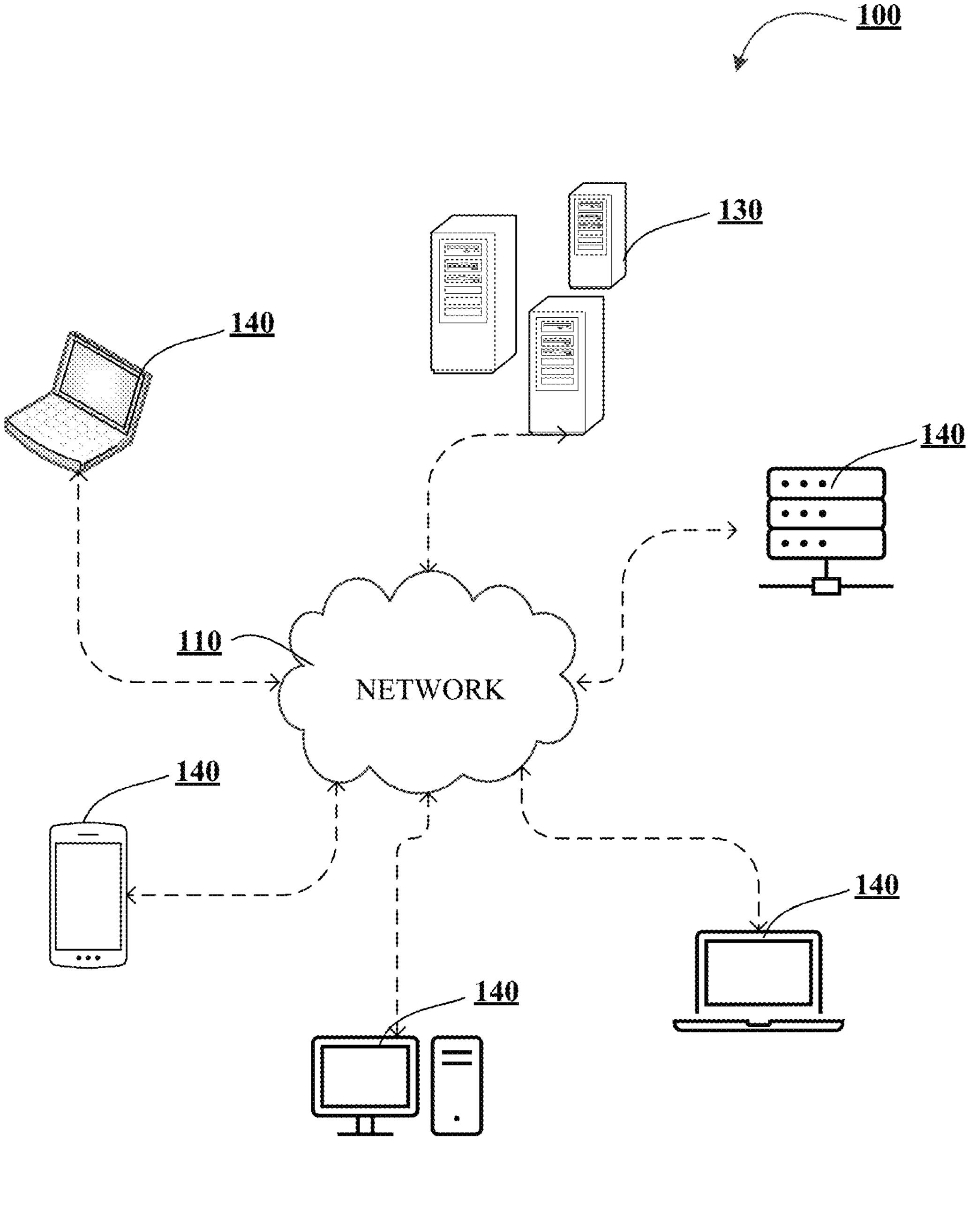
Figure 1B:
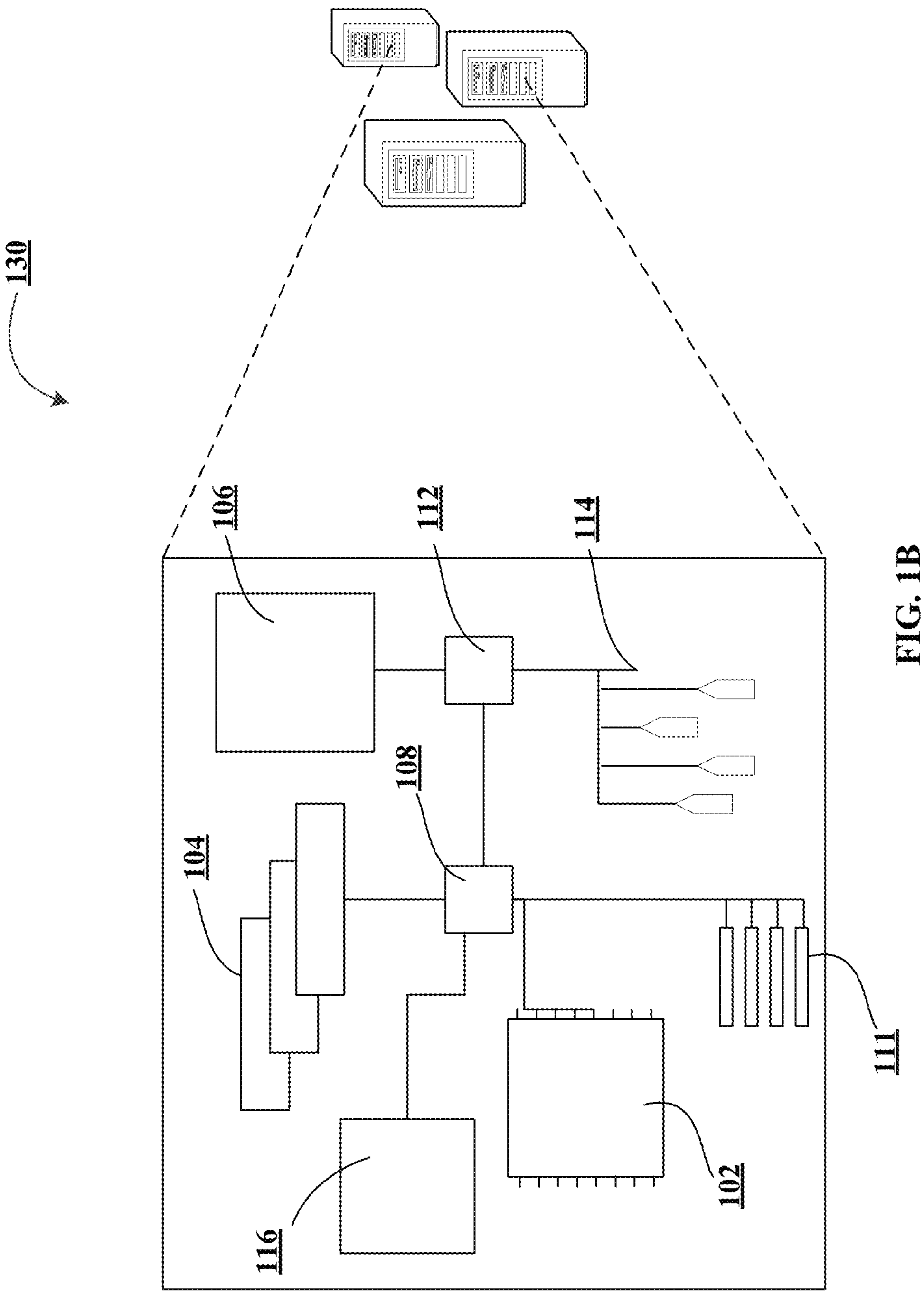
Figure 1C:
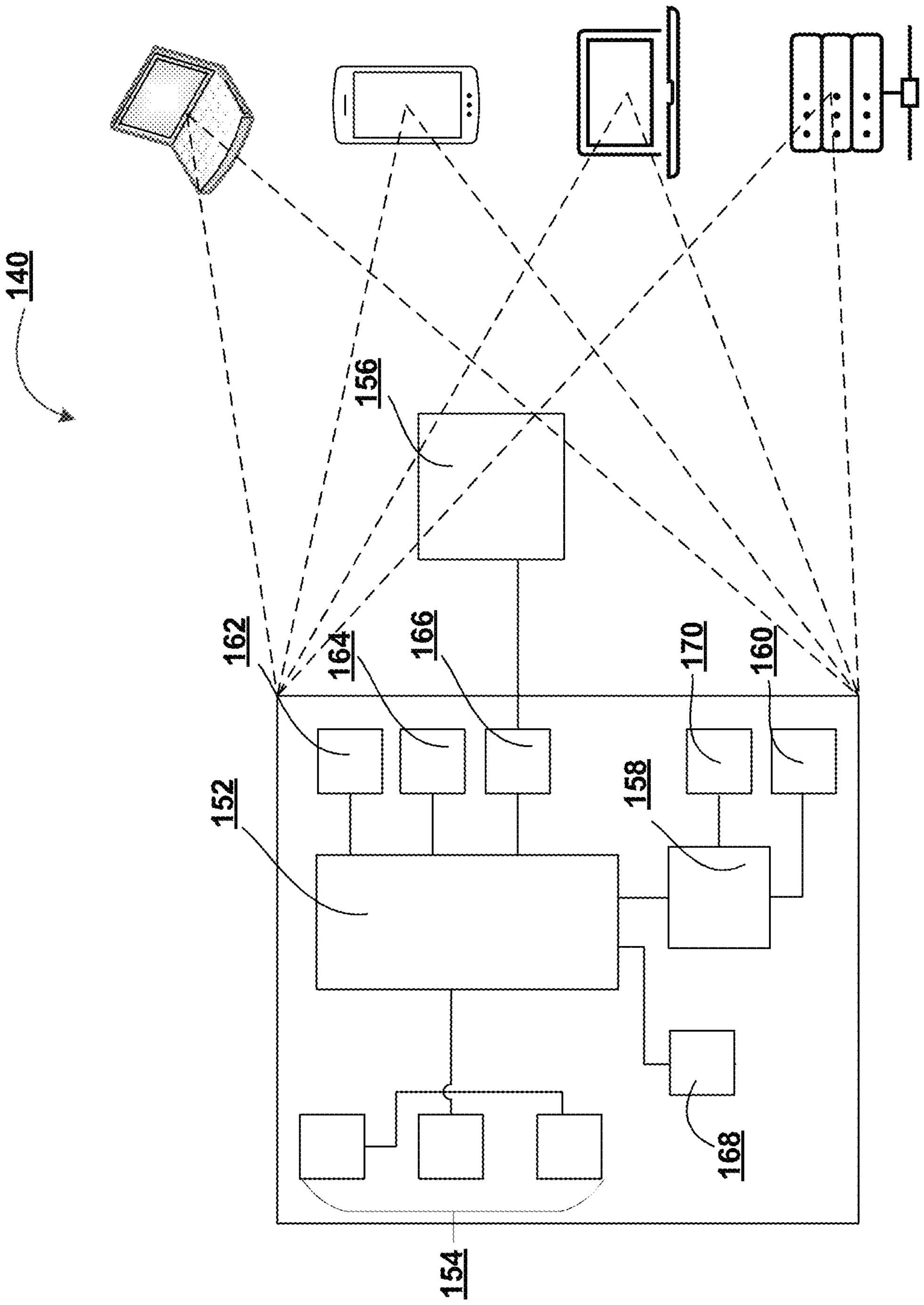
Figure 2:
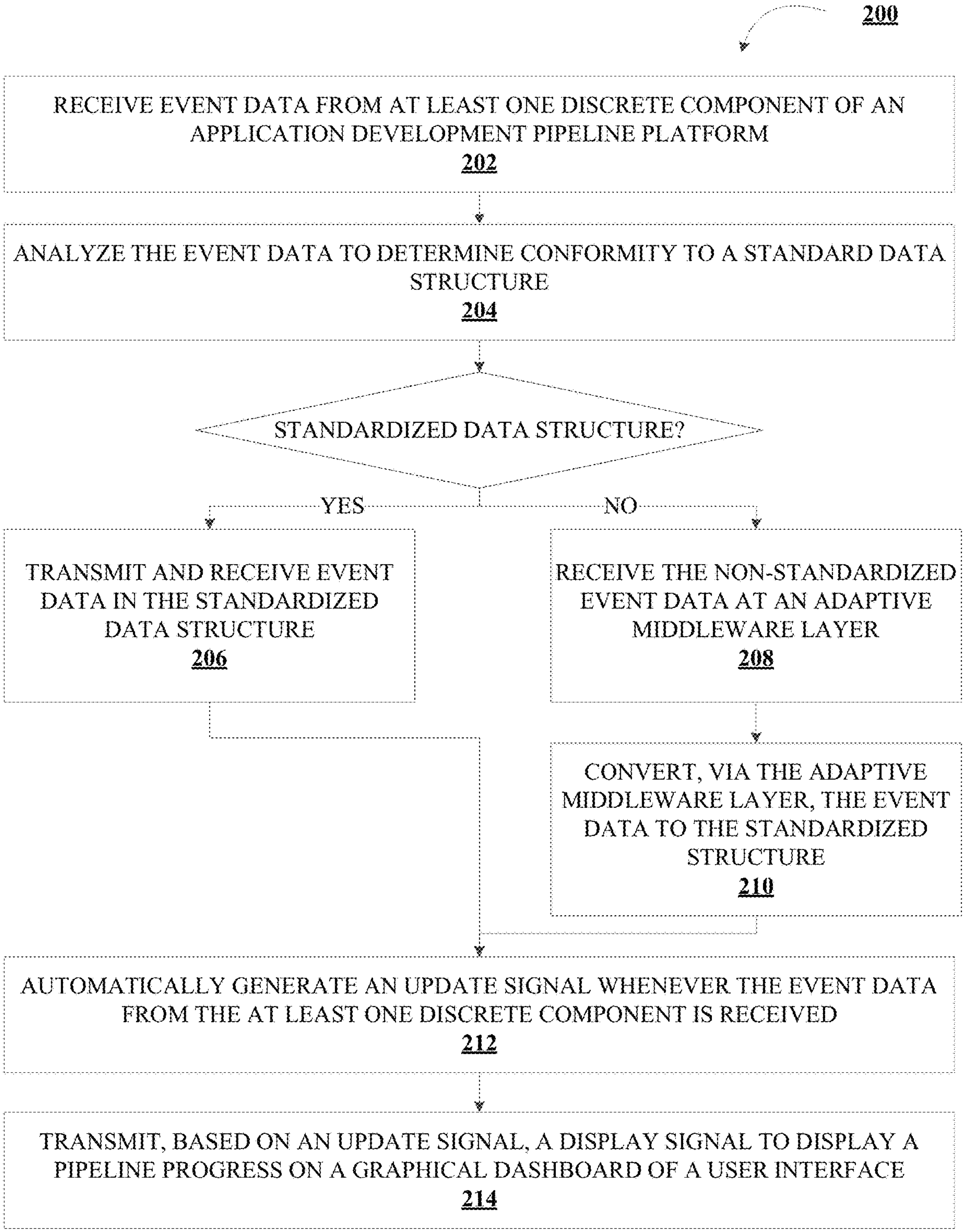
Figure 3:
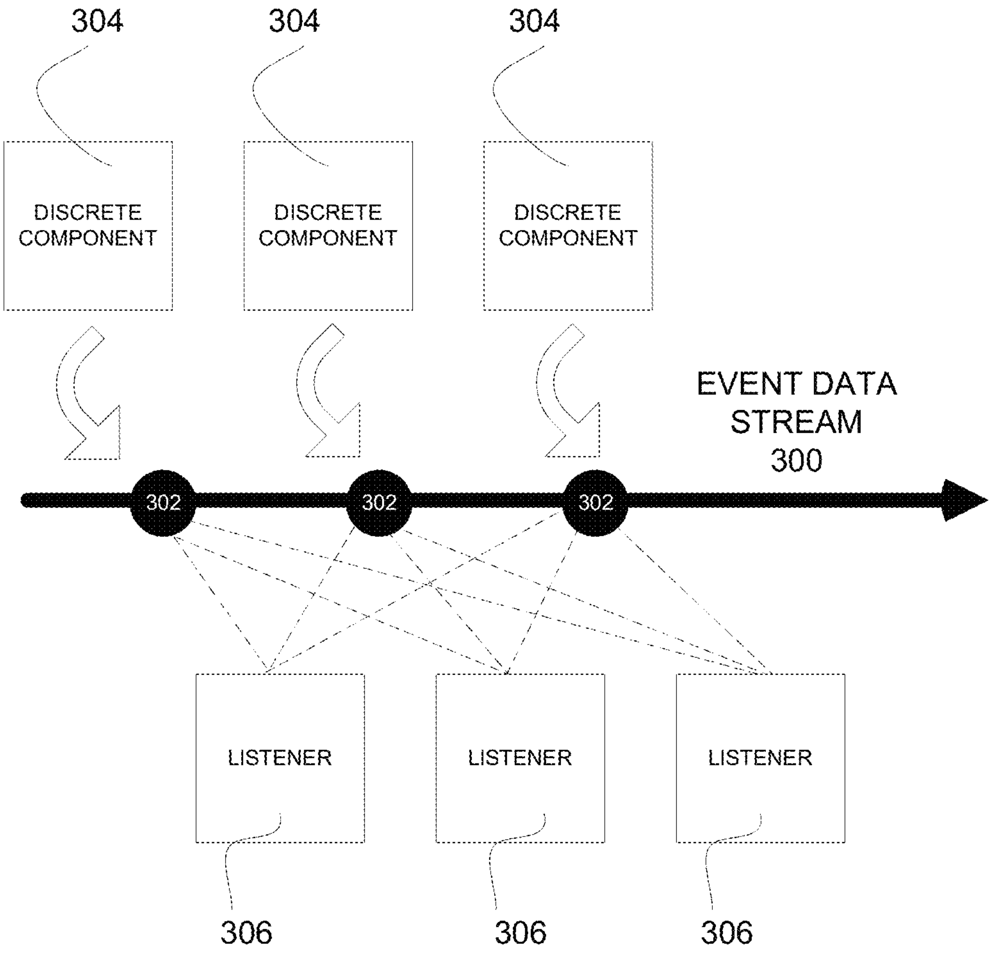

Having thus described embodiments of the invention in general terms, reference will now be made the accompanying drawings, wherein:

FIGS. 1A-1C illustrate technical components of an exemplary distributed computing environment for centralized application development and pipeline management via event data streaming, in accordance with an embodiment of the invention;

FIG. 2 illustrates a flow diagram for centralized application development and pipeline management via event data streaming, in accordance with an embodiment of the invention; and FIG. 3 illustrates a schematic for centralized application development and pipeline management via event data streaming, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As used herein, an “entity” may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a “user” may be an individual associated with an entity. As such, in some embodiments, the user may be an individual having past relationships, current relationships or potential future relationships with an entity. In some embodiments, a “user” may be an employee (e.g., an associate, a project manager, an IT specialist, a manager, an administrator, an internal operations analyst, or the like) of the entity or enterprises affiliated with the entity, capable of operating the systems described herein. In some embodiments, a “user” may be any individual, entity or system who has a relationship with the entity, such as a customer or a prospective customer. In other embodiments, a user may be a system performing one or more tasks described herein.

As used herein, a “user interface” may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an “engine” may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that “operatively coupled,” as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" or "user interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, a transmission of a digital audio signal, or the like. As used herein, an "interacting user" may refer to a user who is engaging in the interaction, such as a caller to a helpdesk, a customer interacting with a digital assistant, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

The technology described herein implements an approach to integrating software development plug-ins with a novel computer program product that captures streams of event data from such software development plug-ins and presents various events, reports, and statistics on a graphical user interface. Instead of relying on manual reconfiguration and integration of discrete component(s) into an application development pipeline platform, each discrete component being subject to its own development cycle, the technology described herein allows for the use of the discrete component(s) through a unified metadata package, or in some embodiments, through a middleware component integrated with the application development pipeline platform.

Prior to the invention described herein, the state of technology in integrating, implementing, and monitoring discrete components (i.e., "plug-ins") within the application development pipeline platform was inadequate. One of the long-standing technical challenges in the realm of software development and Continuous Integration/Continuous Deployment ("CI/CD") is the notable absence of communication streams and centralized reporting within a network of plug-ins and tools used in the application development pipeline process. This challenge arises primarily from the diverse range of plug-ins that cater to various specialized tasks and functionalities, often operating in isolation from one another. The consequence of this fragmented approach is the creation of siloed information, making it arduous for development teams to acquire a comprehensive perspective of the entire software development lifecycle. This lack of coordination leads to difficulties in making data-driven decisions and introduces inefficiencies into the development workflow, as teams often find themselves grappling with disjointed data sources and redundant processes. Furthermore, the disjointed nature of this ecosystem presents a significant impediment to the integration of new plug-ins into existing workflows. As organizations seek to leverage the latest tools and technologies to enhance their development processes, they encounter a host of challenges related to compatibility and workflow disruptions. These issues can lead to considerable setbacks, not only in terms of time and effort but also in the potential for introducing bugs and errors into the development pipeline.

The invention disclosed herein provides a solution. The technical solution described here reflects a significant development in the mitigation of errors, and the control of workflow disruptions, by providing for a system capable of receiving event data from each discrete component, where the event data is either transformed into a standardized metadata format or already communicated in such format, and communicating various reports and statistics related to the application development pipeline to stakeholders via graphical transmission.

Accordingly, the present disclosure provides for a system, computer program product, and method for such receiving and transformation of event data. Event data, such as version control, security, scanning, load testing, code review, and functional testing, is received from discrete components of an application development pipeline platform. The event data is received directly, via webhooks, or via change data capture. The event data is analyzed to determine conformity to a standardized data structure. If the discrete components already transmit and receive event data in the standardized data structure, the application development pipeline platform communicates with such discrete components directly. If the discrete components don't transmit and receive event data in the standardized data (i.e., it is in a non-standardized data structure), a middleware layer receives the event data from the discrete components and converts the event data from the discrete components to the standardized data structure. An update signal is generated automatically whenever event data from the discrete components is received. Based on this update signal, a display signal is transmitted to display a pipeline progress on a graphical dashboard of a user interface.

Thus, the present invention provides a technical solution to a technical problem. As described herein, the technical problem includes a wide variety of data types for event data that leads to application pipeline development platforms often having outdated discrete components. The technical solution presented herein allows for the communication of event data from various discrete components to a centralized application pipeline development platform, as-needed transformation of such event data into a standardized data format, and displaying of graphical depictions of the application development pipeline, including statistical anomalies determined by a machine learning model. As such, the present technical solution allows for application development pipeline activities (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, and (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment 100 for centralized application development and pipeline management via event data streaming, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and one or more storage devices 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the one or more storage devices 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the disclosure. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130, and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a flow diagram 200 for centralized application development and pipeline management via event data streaming, in accordance with an embodiment of the invention.

At block 202, the system 130 receives event data from at least one discrete component of an application development pipeline platform. The application development pipeline platform may be an element of modern software development, facilitating the efficient delivery of software applications from code to production through its own software application. This pipeline may comprise various stages, from source code management and continuous integration to deployment and monitoring. The purpose of block 202 is to gather event data generated during the execution of these stages and use it for analysis, monitoring, and optimization.

The application development pipeline platform uses at least one discrete component. As used herein, a "discrete component" may refer to a software module, where typically each discrete component is used by the entity within the application development pipeline platform to perform a task on source code for an application development. For example, one discrete component might be a version control system responsible for tracking changes to the source code and enabling collaboration among developers. Another discrete component could be a build automation tool that automates the process of compiling, testing, and packaging the code. Additionally, a code review tool may serve as a discrete component for facilitating peer reviews and ensuring code quality. Importantly, each discrete component traditionally operates independently and is subject to its own development cycle, such that for each subsequent new release of a discrete component, an entity is tasked with reconfiguring the application development pipeline platform, programming various interconnecting modules, or the like in order to integrate the new release into the application development pipeline platform. For example, if a new version of a version control discrete component is released by a $3^{rd}$ party, it may take several weeks or months to properly integrate the use of the new version, leading to inefficiencies in application development and hindered technological progress.

The event data collected at block 202 is output by the discrete component(s) as numerous types of data, including but not limited to build and deployment/publishing logs, error reports, performance metrics, version control, security, scanning, load testing, code review, and functional testing, or other relevant metadata. These events provide users with metrics are milestones for the health and efficiency of the development pipeline, as well as identify bottlenecks, failures, or areas for improvement. The event data could be generated by discrete components such as version control systems, build servers, testing frameworks, deployment tools, and various monitoring and observability services integrated into the pipeline within these discrete components.

As will be discussed in greater detail herein, in some embodiments once the event data is received, it may undergo processing and analysis to extract insights from this data. This can involve parsing logs, aggregating metrics, and using machine learning algorithms for anomaly detection, predictive analytics, and performance optimization.

In some embodiments, the system 130 may receive event data from multiple sources within the application development pipeline. This may include not only discrete components but also third-party tools. One or more listeners may be utilized to monitor for the event data, such that the one or more listeners wait for incoming event data and respond when such event data is present in the event data stream.

In some embodiments, receiving the event data from the at least one discrete component may include receiving the event data via receiving the event data directly. The application development pipeline platform may directly interface with the discrete components without the need for intermediate data transformation or translation layers/middleware components. Communication channels or Application Programming Interfaces ("APIs") may be used to connect with discrete components, such that the one or more listeners are in communication with both the application development pipeline platform and the event data directly.

In some embodiments, the system 130 may receive the event data from the at least one discrete component via webhooks. The discrete components may send HTTP requests to predefined endpoints on the pipeline platform whenever events occur. In some embodiments, the platform processes these incoming webhook requests and triggers relevant actions in the application development pipeline platform. In such embodiments, the one or more listeners may be webhook listeners that listen for webhooks containing the event data that may be sent by one or more of the discrete components, and perform the actions described herein as a result.

In some embodiments, receiving the event data from the at least one discrete component may include receiving the event data via change data capture. The system 130 may track changes within discrete components and capture these changes as events, allowing the platform to stay updated in near real-time. When a change occurs within these components, such as a database record update, insertion, or deletion, the change data capture mechanism identifies the change and translates it into an event. This event is then transmitted to the application development pipeline platform and the one or more listeners may be change data capture listeners designed to respond to such events.

In some embodiments, the change data capture may use triggers, logs, or specific connectors within discrete components to monitor and capture changes. As one non-limiting example, in a database system, database triggers may be used by the change data capture to detect and record changes made to tables. Additionally, or alternatively, message brokers may be configured to publish events when messages are sent or received, thereby capturing the data flow.

In some embodiments, integration of change data capture into the application development pipeline platform may include mapping and transformation of the captured change events into a standardized format that the one or more listeners can understand and process effectively.

Next, at block 204, the system 130 analyzes the event data to determine conformity to a standardized data structure. As used herein, the "standard data structure" may refer to a standard metadata package that is used to integrate and communicate with the application development pipeline platform. The system 130 compares the structure, content, and semantics of the event data to predefined standards of a standard metadata package. These predefined standards are a reference point and my include the expected structure, data types, naming conventions, and any specified constraints or rules.

The system 130 receives incoming event data and initiates the validation process. It assesses the data's structure to ensure it adheres to the structure outlined in the standard metadata package. This includes verifying that the event data contains the same fields, maintains the hierarchical order, and employs consistent data types. In some embodiments, field names may be examined for conformity. The system 130 determined if the names of fields in the event data correspond to the field names detailed in the standard metadata package. In some embodiments, the system 130 analyses the data type, where the system 130 confirms that the data type(s) used in the event data match those stipulated in the standard metadata package. Any deviations are considered non-conformities. In some embodiments, the system 130 may also check for compliance with constraints specified in the metadata package, such as minimum and maximum values, patterns, or allowed value lists.

In some embodiments, the system 130 verifies that all the required fields, as mandated by the metadata package, are present in the incoming event data such as to confirm data completeness.

In some embodiments, when the event data does not conform to the standard metadata package, the system 130 may generate one or more errors or exceptions. The system 130 may attempt to transform the event data to bring it into compliance, such as that which will be described fully herein. Additionally, or alternatively, the system 130 may log these non-conformities for further analysis or trigger alerts to be displayed on a graphical user interface.

As a result of the analysis in block 204, the system 130 has made a determination of whether the event data is in a standardized data structure (i.e., a standard metadata package). If the event data is in the standardized data structure, the process continues at block 206, where the at least one discrete component transmit and receive event data in the standardized event structure. In other words, the system 130 may allow for future communication of event data with these specified at least one discrete components without the need for analyzing the event data for the structure of the event data, such that the system 130 is configured to accept that the event data is in the standardized data structure without any analysis.

However, if as a result of the analysis in block 204, the system 130 has made a determination that the event data is not in the standardized data structure, the process continues at block 208, where the system 130 receives, at an adaptive middleware layer, the event data from the at least one discrete component, since the at least one discrete component transmits and receives event data in a non-standardized data structure.

In some embodiments, one or more of the discrete components communicate event data in the standardized data structure, while one or more other discrete components communicate in a non-standard data structure. In other words, the group of discrete components all integrated with the application development pipeline platform may include both scenarios, where a middleware layer may be implemented for a dedicated group of discrete component(s), while the application development pipeline platform communicates with other discrete component(s) via the standardized data structure without the need for a middleware layer.

At block 210, the system 130 converts, via this adaptive middleware layer, the event data from the at least one discrete component to the standardized data structure. The function of the middleware layer is to convert nonconforming data (e.g., data not in the standardized data structure) from at least one discrete component into the standardized data structure. The process may use one or more stages of transformation, including data mapping to ensure field alignment, data type conversion, field renaming, hierarchical adjustment, constraint enforcement, and completeness verification. For example, in a financial application, a source dataset containing "Transfer_amount" might be mapped to "Amount" in the target dataset, ensuring that the data retains its intended meaning during the conversion process. Similarly, if the source data uses a string data type for "Customer_location," data type conversion would change it to an integer to align with the target dataset's "location" attribute. In some embodiments, semantic validation is conducted to maintain consistency, while any non-transformable elements in the nonconforming data may be logged or trigger alerts for manual intervention.

Regardless of the data structure of the event data, and whether or not it has been received by a middleware layer to be converted/transformed into a standardized data structure, the process continues at block 212 by automatically generating an update signal whenever the event data from the at least one discrete component is received. The update signal is provided as a means to communicate the presence of the event data itself, and/or various aspects of what the event data is communicating in regards to the build and deployment logs, error reports, performance metrics, version control, security, scanning, load testing, code review, and functional testing, or other relevant metadata. The update signal may contain metadata about the event data received from the discrete component, including the source, timestamp, event type, or specific details related to the event. Accordingly, the update signal enables real-time monitoring, tracking, and management of the application's lifecycle. In some embodiments, when received, this signal triggers a series of predetermined actions in the software development pipeline, such as subsequent development steps or analyses, automated build process, quality checks such as code review, security scanning, and functional testing. In some embodiments, as will be discussed with respect to block 214, the system 130 may use the update signal to monitor the development pipeline. In some embodiments, code changes are automatically built, tested, and deployed whenever the update signal is received, to provide rapid software delivery.

Next, at block 214, the system 130 may transmit, based on the update signal, a display signal to display a pipeline progress on a graphical dashboard of a user interface of one or more endpoint device 140. The user interface may display graphical representation(s) of application development pipeline progress, system behavior for one or more applications, resource utilization, and performance metrics.

For example, graphical representations featured on the user interface may include charts, graphs, progress bars, or any other suitable means to represent data. These visuals provide users with an at-a-glance overview of the state of application development pipelines and associated metrics.

One aspect of the operation of the system 130 is the use of update signals to trigger the transmission of display data to the dashboard. Consequently, the user interface reflects the most up-to-date information, for monitoring pipeline progress in real-time. Additionally, or alternatively, the dashboard may be configured to display system 130 behavior for one or more applications through the graphical representations. Additionally, or alternatively, the system 130 may monitor and display information regarding the allocation and consumption of computing resources, such as CPU, memory, and storage. Additionally, or alternatively, performance metrics may be provided on the dashboard.

The system 130 may collect and presents data related to the performance of applications and the pipeline itself. These metrics may include response times, throughput, or error rates. Additionally, or alternatively, embodiments of this system 130 allow for variations in the graphical representation and customization options of the dashboard. Additionally, or alternatively, the system 130 may offer integration with third-party tools and services, such that additional data sources are displayed and monitored, including project management software tasks and deadlines, calendar events, or the like.

In some embodiments, the pipeline progress displayed on the graphical user interface may include the event data, such as to provide a full retroactive accounting of every event that has occurred, related either to one or more specific discrete components, related to the application that is the subject of the application development pipeline, or multiple applications. For example, when an event occurs, it may be timestamped and logged into a centralized database. This database stores event data, such as the type of event, its source, and any relevant contextual data. The system 130 may, at a predetermined time interval, query and retrieve this event data, such as to display this data on the graphical user interface and provide insights into the development pipeline history. In some embodiments, the event data may be filtered in combination with the event data being displayed, such as being filtered by which discrete component it originated from, time window, and so forth.

Additionally, or alternatively, in some embodiments the update signal may trigger a notification sent to at least one endpoint device 140. The notification may include details regarding the occurrence of a specific event, as determined by the listeners. The specific event may be predetermined to trigger the notification via the update signal. For example, an entity may predetermine that each time "publishing" event data has been added to the event data stream, a notification is triggered and transmitted to at least one endpoint device 140.

In some embodiments, a machine learning model may be implemented for anomaly detection to detect anomalies in the application development pipeline. It shall be appreciated that a large amount of event data may be generated by the at least one discrete component, and as such an automated process for identifying anomalies is beneficial. In some embodiments, the machine leaning model may be a recurrent neural network (RNN) or similar type of machine learning model consisting of various layers of neurons, with weights connecting them. During training, the machine learning model may learn these weights to predict the next event in the sequence based on historical data. The training of the machine learning model may involve using a dataset that comprises both normal and anomalous event sequences. Weights within the RNN are predetermined through a supervised learning process but are adjustable using techniques like backpropagation to minimize the prediction error.

In some embodiments, hyperparameters of the machine learning model may be adjusted to improve the accuracy of the output. In some embodiments, feature engineering and domain-specific knowledge can be incorporated into the model. For instance, specific event types, timestamps, or contextual information related to deployment, error reports, security scans, and other relevant events can be included to make the model more sensitive to the nuances of the application development pipeline.

FIG. 3 illustrates a schematic for centralized application development and pipeline management via event data streaming, in accordance with an embodiment of the invention. As illustrated in FIG. 3, the event data stream 300 is depicted graphically as a temporal-sequenced time arrow, with event data 302 positioned in a chronological order from left to right. As a discrete component 304 provides event data 302, one or more listeners 306 may receive and react from the event data 302 of the event data stream 300 in real-time or near-real-time via the techniques described herein (such as change data capture, webhooks, or direct).

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for centralized application development and pipeline management via event data streaming, the system comprising:

a processing device;

a non-transitory storage device containing instructions when executed by the processing device, causes the processing device to perform the steps of:

receiving event data from at least one discrete component of a plurality of discrete components of an application development pipeline platform, each discrete component of the plurality of discrete components operating independently and subject to its own development cycle, wherein the event data is output by the at least one discrete component, and wherein the event data is at least one selected from the group consisting of build logs, deployment logs, error reports, and performance metrics;

analyzing the event data to determine conformity to a standardized data structure by comparing content of the event data to predefined standards of a standard metadata package, wherein the standardized data structure comprises a metadata package for communicating with the application development pipeline platform;

routing, in response to determining non-conformity to the standardized data structure, the event data from at least one discrete component of a plurality of discrete components through an adaptive middleware layer that performs data mapping and data type conversion to transform the event data into the standardized data structure, wherein the data mapping comprises field alignment, and wherein the data type conversion comprises data type conversion;

automatically generating an update signal whenever the event data from the at least one discrete component is received, wherein the update signal comprises metadata about the event data, the update signal triggering one or more predetermined actions of at least one selected from the group consisting of automated building, quality checks, and security scanning; and transmitting, based on the update signal, a display signal to display a pipeline progress on a graphical dashboard of a user interface, wherein the pipeline progress comprises the event data.

2. The system of claim 1, wherein the at least one discrete component transmits and receives event data in the standardized data structure.

3. The system of claim 1, wherein receiving the event data from the at least one discrete component comprises receiving the event data via receiving the event data directly.

4. The system of claim 1, wherein receiving the event data from the at least one discrete component comprises receiving the event data via webhooks.

5. The system of claim 1, wherein receiving the event data from the at least one discrete component comprises receiving the event data via change data capture.

6. The system of claim 1, wherein the event data is an output of at least one selected from a group consisting of: version control, security, scanning, load testing, code review, and functional testing.

7. A computer program product for centralized application development and pipeline management via event data streaming, the computer program product comprising a non-transitory computer-readable medium storing code causing an apparatus to:

receive event data from at least one discrete component of a plurality of discrete components of an application development pipeline platform, each discrete component of the plurality of discrete components operating independently and subject to its own development cycle, wherein the event data is output by the at least one discrete component, and wherein the event data is at least one selected from the group consisting of build logs, deployment logs, error reports, and performance metrics;

analyze the event data to determine conformity to a standardized data structure by comparing content of the event data to predefined standards of a standard metadata package, wherein the standardized data structure comprises a metadata package for communicating with the application development pipeline platform;

route, in response to determining non-conformity to the standardized data structure, the event data from at least one discrete component of a plurality of discrete components through an adaptive middleware layer that performs data mapping and data type conversion to transform the event data into the standardized data structure, wherein the data mapping comprises field alignment, and wherein the data type conversion comprises data type conversion;

automatically generate an update signal whenever the event data from the at least one discrete component is received, wherein the update signal comprises metadata about the event data, the update signal triggering one or more predetermined actions of at least one selected from the group consisting of automated building, quality checks, and security scanning; and transmit, based on the update signal, a display signal to display a pipeline progress on a graphical dashboard of a user interface, wherein the pipeline progress comprises the event data.

8. The computer program product of claim 7, wherein the at least one discrete component transmits and receives event data in the standardized data structure.

9. The computer program product of claim 7, wherein receiving the event data from the at least one discrete component comprises receiving the event data via receiving the event data directly.

10. The computer program product of claim 7, wherein receiving the event data from the at least one discrete component comprises receiving the event data via webhooks.

11. The computer program product of claim 7, wherein receiving the event data from the at least one discrete component comprises receiving the event data via change data capture.

12. The computer program product of claim 7, wherein the event data is an output of at least one selected from a group consisting of: version control, security, scanning, load testing, code review, and functional testing.

13. A method for centralized application development and pipeline management via event data streaming, the method comprising:

receiving event data from at least one discrete component of a plurality of discrete components of an application development pipeline platform, each discrete component of the plurality of discrete components operating independently and subject to its own development cycle, wherein the event data is output by the at least one discrete component, and wherein the event data is at least one selected from the group consisting of build logs, deployment logs, error reports, and performance metrics;

analyzing the event data to determine conformity to a standardized data structure by comparing content of the event data to predefined standards of a standard metadata package, wherein the standardized data structure comprises a metadata package for communicating with the application development pipeline platform;

routing, in response to determining non-conformity to the standardized data structure, the event data from at least one discrete component of a plurality of discrete components through an adaptive middleware layer that performs data mapping and data type conversion to transform the event data into the standardized data structure, wherein the data mapping comprises field alignment, and wherein the data type conversion comprises data type conversion;

automatically generating an update signal whenever the event data from the at least one discrete component is received, wherein the update signal comprises metadata about the event data, the update signal triggering one or more predetermined actions of at least one selected from the group consisting of automated building, quality checks, and security scanning; and transmitting, based on the update signal, a display signal to display a pipeline progress on a graphical dashboard of a user interface, wherein the pipeline progress comprises the event data.

14. The method of claim 13, wherein the at least one discrete component transmits and receives event data in the standardized data structure.

15. The method of claim 13, wherein receiving the event data from the at least one discrete component comprises receiving the event data via webhooks.

16. The method of claim 13, wherein receiving the event data from the at least one discrete component comprises receiving the event data via change data capture.

17. The method of claim 13, wherein the event data is an output of at least one selected from a group consisting of: version control, security, scanning, load testing, code review, and functional testing.

* * * * *